(12) United States Patent
Nakagawa et al.

(10) Patent No.: US 11,460,421 B2
(45) Date of Patent: Oct. 4, 2022

(54) INSPECTION SYSTEM AND INSPECTION METHOD OF MEMBER FOR FUEL CELL SEPARATOR

(71) Applicant: TOYOTA JIDOSHA KABUSHIKI KAISHA, Toyota (JP)

(72) Inventors: Noritoshi Nakagawa, Toyota (JP); Kazutaka Tachibana, Toyota (JP); Takuya Itakura, Toyota (JP); Hitoshi Terashi, Kakogawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 16/884,270

(22) Filed: May 27, 2020

(65) Prior Publication Data

US 2021/0072172 A1    Mar. 11, 2021

(30) Foreign Application Priority Data

Sep. 9, 2019   (JP) .............................. JP2019-163623

(51) Int. Cl.
*G01N 25/00*       (2006.01)
*H01M 8/0202*      (2016.01)
*H01M 8/0432*      (2016.01)
*H01M 8/04664*     (2016.01)

(52) U.S. Cl.
CPC .......... *G01N 25/00* (2013.01); *H01M 8/0202* (2013.01); *H01M 8/04365* (2013.01); *H01M 8/04671* (2013.01)

(58) Field of Classification Search
CPC ........ G01N 25/72; G01N 25/18; G01N 25/00; G01J 5/00; G01J 2005/0077; H01M 8/0202; H01M 8/04365; H01M 8/04671
See application file for complete search history.

(56) References Cited

U.S. PATENT DOCUMENTS

2013/0230072 A1*  9/2013  Couse ............... H01M 8/04664
                                                    374/5
2014/0140369 A1*  5/2014  Erhart ................. H01M 10/482
                                                    374/121

FOREIGN PATENT DOCUMENTS

JP       2018146251 A     9/2018
JP       2019028078 A     2/2019

* cited by examiner

*Primary Examiner* — Brian R Ohara
*Assistant Examiner* — Patrick Marshall Greene
(74) *Attorney, Agent, or Firm* — Dickinson Wright, PLLC

(57) ABSTRACT

An inspection system of a member for a fuel cell separator including a titanium or titanium alloy base material and a coating layer including carbon includes a heater configured to heat the member for a fuel cell separator, a temperature detector configured to detect a temperature of the member for a fuel cell separator after heated by the heater, and a determination unit configured to determine a position of a high-temperature place at which a degree of a temperature increase is greater than a previously-set standard in the member for a fuel cell separator using the temperature detected by the temperature detector.

5 Claims, 6 Drawing Sheets

INSPECTION SYSTEM AND INSPECTION METHOD OF MEMBER FOR FUEL CELL SEPARATOR

INCORPORATION BY REFERENCE

The disclosure of Japanese Patent Application No. 2019-163623 filed on Sep. 9, 2019 including the specification, drawings and abstract is incorporated herein by reference in its entirety.

BACKGROUND

1. Technical Field

The present disclosure relates to an inspection system and an inspection method of a member for a fuel cell separator.

2. Description of Related Art

As an inspection method of a surface of a member configuring a fuel cell, for example, a method in which light is radiated to a gas diffusion electrode, and image data obtained using an image-capturing device configured to receive reflected light or transmitted light is processed, thereby inspecting the appearance defect of the gas diffusion electrode is proposed (for example, Japanese Unexamined Patent Application Publication No. 2019-28078).

SUMMARY

However, in the case of using, as a configuration member of a fuel cell, for example, a gas separator in which a surface of a titanium-based parent material is coated with a coating layer including carbon, there is a case where a portion in which carbon is excessively present, which is an uneven portion of the surface, cannot be detected with a sufficient accuracy even when an image of the surface of the gas separator is captured and analyzed. This is because there is a case where, the color of the titanium-based parent material significantly changes due to the thickness of a titanium oxide layer on the surface and the difference from the color of carbon becomes small.

The present disclosure is capable of realizing the following aspects.

(1) An aspect of the present disclosure provides an inspection system of a member for a fuel cell separator. In the inspection system, the member for a fuel cell separator includes a titanium or titanium alloy base material and a coating layer that includes carbon and is formed on a surface of the base material. The inspection system includes a heater configured to heat the member for a fuel cell separator, a temperature detector configured to detect the temperature of the member for a fuel cell separator after heated by the heater, and a determination unit configured to determine a position of a high-temperature place at which the degree of a temperature increase is greater than a previously-set standard in the member for a fuel cell separator using the temperature detected by the temperature detector.

With this aspect of the inspection system of a member for a fuel cell separator, it is possible to specify a place in which carbon is excessively present by determining the position of the high-temperature place at which the degree of a temperature increase after heating by the heater is greater than the previously-set standard. Therefore, it is possible to accurately detect the place in which carbon is excessively present regardless of the color of the surface of the member for a fuel cell separator attributed to the thickness of a titanium oxide layer.

(2) The above-described aspect of the inspection system of a member for a fuel cell separator may further include a heat suppression member disposed between the heater and the temperature detector and configured to suppress heat input from the heater to the temperature detector. With this aspect of the inspection system, the heat suppression member suppresses heat input from the heater to the temperature detector, and thus it is possible to suppress an increase in a detection value of the temperature detector attributed to heat radiated from the heater. Therefore, the detection value of the temperature detector exceeding an appropriate temperature range is suppressed, whereby it is possible to increase the detection accuracy at the time of detecting the temperature of the member for a fuel cell separator. Furthermore, it is possible to decrease the possibility of the temperature detector being damaged due to heat radiated from the heater.

(3) In the above-described aspect of the inspection system of a member for a fuel cell separator, the heater may heat the member for a fuel cell separator in a state of being not in contact with the member for a fuel cell separator, the temperature detector may detect the temperature of the member for a fuel cell separator in a state of being not in contact with the member for a fuel cell separator, and the member for a fuel cell separator may be formed in a band shape and may be transported in the longitudinal direction such that the temperature is detected by the temperature detector after the member for a fuel cell separator is heated by the heater. With this aspect of the inspection system, it becomes possible to easily increase the speed of an inspection step of a member for a fuel cell separator.

(4) In the above-described aspect of the inspection system of a member for a fuel cell separator, the member for a fuel cell separator may include the coating layers on both surfaces of the base material respectively, and the temperature detector may be provided to each of the coating layers. With this aspect of the inspection system, regardless of which surface of the member for a fuel cell separator the place in which carbon is excessively present is present on, it is possible to accurately detect the place.

The present disclosure can be realized in a variety of forms other than that described above and, for example, can be realized in a form of an inspection method of a member for a fuel cell separator, a manufacturing method of a fuel cell including the inspection method, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
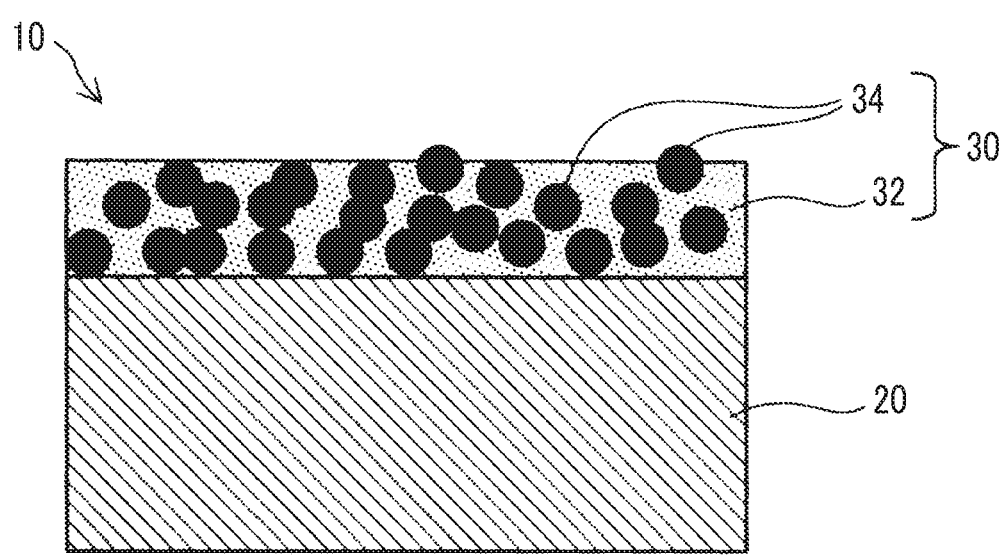
FIG. 1 is a schematic cross-sectional view showing the schematic configuration of a member for a fuel cell separator.

A. First Embodiment (A-1) Configuration of Member for Fuel Cell Separator:

FIG. 1 is a schematic cross-sectional view showing the schematic configuration of a member for a fuel cell separator 10 of a first embodiment. The present embodiment is characterized by the inspection operation of the member for a fuel cell separator 10; however, first, the member for a fuel cell separator 10, which is an inspection subject, will be described. The member for a fuel cell separator 10 includes a base material 20 and a coating layer 30. The coating layer 30 is formed so as to cover a surface of the base material 20. FIG. 1 shows an appearance of one surface of the member for a fuel cell separator 10, and, in the member for a fuel cell separator 10 of the present embodiment, the coating layers 30 are provided so as to cover both surfaces of the base material respectively.

The base material 20 is formed of titanium or a titanium alloy. As the titanium alloy, for example, a Ti—Al-based alloy including Ti-6A1-4V, a Ti—Nb-based alloy, a Ti—Ta-based alloy, a Ti—Pd-based alloy, and the like can be exemplified. The thickness of the base material 20 can be set to, for example, 0.05 mm to 1 mm.

The coating layer 30 includes titanium oxide 32 and a plurality of carbon particles 34. The carbon particles 34 are dispersed from the surface through the inside of the coating layer 30 and form a conductive path through which a current flows. As the carbon particles 34, for example, particles of carbon black can be used. Titanium oxide is excellent in corrosion resistance, and carbon is a stable substance that does not easily oxidize at an operation temperature of a fuel cell, and thus, when the coating layer 30 is provided on the surface, the member for a fuel cell separator 10 has a favorable conductive property and favorable corrosion resistance, and it becomes possible to stably suppress contact resistance. The thickness of the coating layer 30 can be set to, for example, 10 nm to 500 nm. The coating layer 30 may further contain other components.

At the time of producing the member for a fuel cell separator 10, first, an application step of preparing the base material 20 and then applying the carbon particles 34 onto the base material 20 is carried out. The base material 20 can be shaped like, for example, a band wound in a roll shape. In such a case, a plurality of fuel cell separators can be continuously manufactured. The carbon particles 34 can be applied to the surface of the base material 20 by applying a water-based or oil-based liquid in which carbon powder is dispersed (dispersion liquid) or directly applying carbon powder. In the water-based dispersion liquid, for example, water can be used as a dispersion medium. In the oil-based dispersion liquid, for example, ethanol, toluene, cyclohexanone, and the like can be used as a dispersion medium. The dispersion liquid may further contain a binder, a surfactant, and the like.

The particle diameter of the carbon powder to be applied can be set to, for example, 20 nm to 200 nm. The amount of the carbon particles 34 applied to the surface of the base material 20 is desirably set to, for example, 1 $\mu g/cm^2$ or more from the viewpoint of enhancing the conductive property of the coating layer 30. In addition, the amount of the carbon particles 34 applied is desirably set to, for example, 2 $\mu g/cm^2$ or more since a favorable conductive property can be maintained for a long period of time even in a high-temperature and acidic atmosphere in a fuel cell. When the amount of the carbon particles 34 applied to the surface of the base material 20 is increased, the effect of the increase in the amount of the carbon particles 34 applied is gradually saturated, and the manufacturing cost increases due to the use of a large amount of the carbon particles 34. Therefore, the amount of the carbon particles 34 applied needs to be set to, for example, 50 $\mu g/cm^2$ or less.

As a method for applying the dispersion liquid to the base material 20, for example, well-known transfer methods such as brush application, bar coating, roll coating, gravure coating, die coating, dip coating, and spray coating can be employed. In the case of applying the carbon powder, it is needed to use a toner produced using carbon black and electrostatically apply the toner to the base material 20.

After the application step, the base material 20 on which the application step has been carried out is thermally treated at a low-oxygen partial pressure, thereby forming the coating layer 30. Due to the thermal treatment step, on the surface of the base material 20, a part or all of titanium atoms that have diffused from the base material 20 oxidize and turn into the titanium oxide 32, whereby the coating layer 30 in which the carbon particles 34 and the titanium oxide 32 are mixed with each other as shown in FIG. 1 is formed.

For the low-oxygen partial pressure, it is possible to set a condition of an oxygen partial pressure being 0.05 Pa or higher and 25 Pa or lower. When the oxygen partial pressure in the thermal treatment step is too high, there is a case where the carbon particles 34 oxidize and decompose and the layer of the titanium oxide 32 becomes too thick. In addition, when the oxygen partial pressure in the thermal treatment step is too low, there is a case where a reaction of the generation of TiC from titanium and carbon excessively progresses. In addition, the temperature of the thermal treatment can be set to, for example, 300° C. to 800° C. The conditions for the application step need to be appropriately set such that the coating layer 30 in which the titanium oxide 32 and the carbon particles 34 are appropriately mixed with each other is formed.

Figure 2:
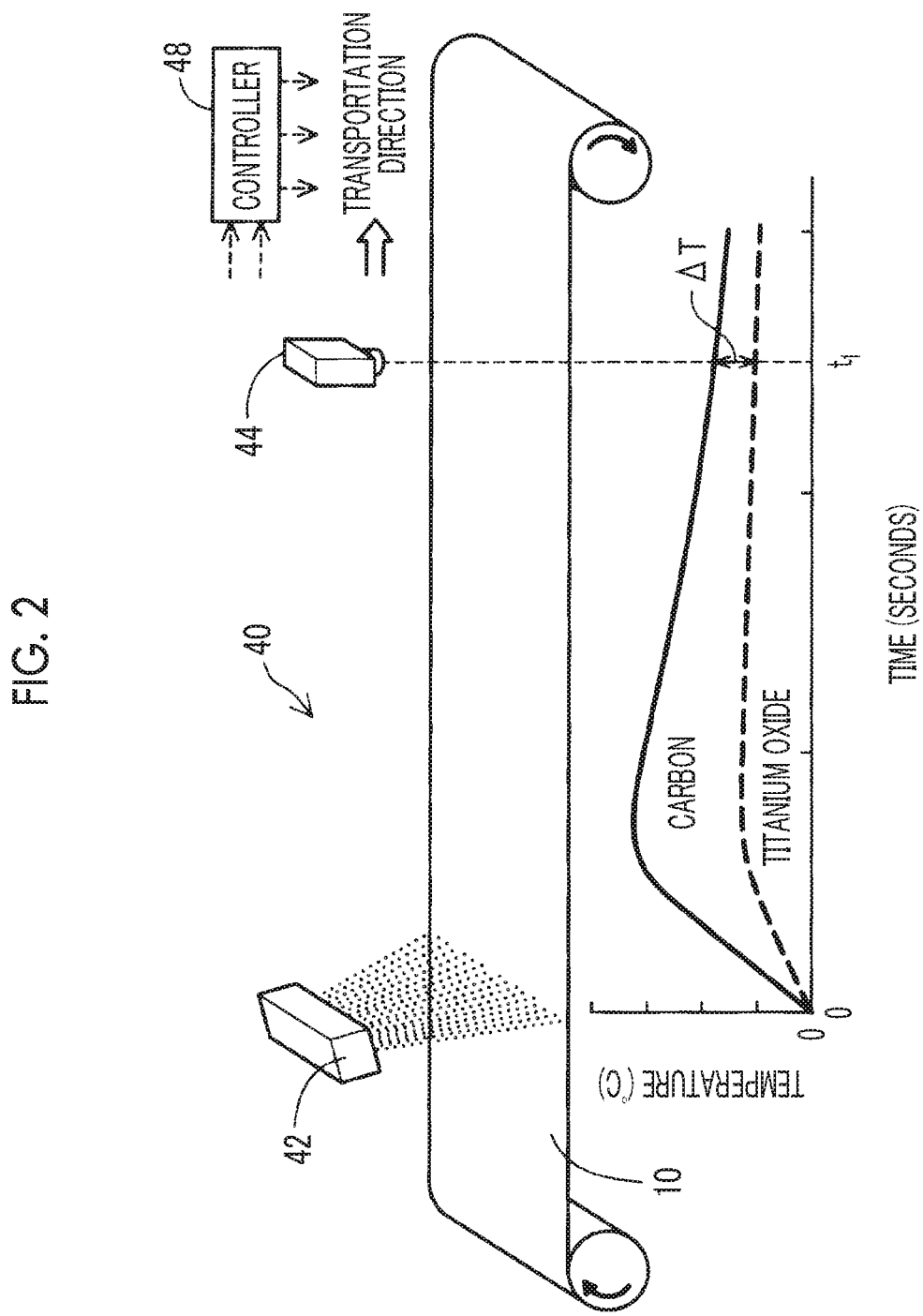
FIG. 2 is a descriptive view showing the schematic configuration of an inspection system.

(A-2) Inspection of Member for Fuel Cell Separator:

FIG. 2 is a descriptive view showing the schematic configuration of an inspection system 40 of the member for a fuel cell separator 10. The inspection system 40 includes a heater 42, a temperature detector 44, and a controller 48.

In the present embodiment, as an inspection subject of the inspection system 40, the band-shaped member for a fuel cell separator 10 wound in a roll shape is used. In the inspection system 40, the member for a fuel cell separator 10 wound in a roll shape is transported such that the member is heated by the heater 42 and then the temperature of the member is detected by the temperature detector 44. In FIG. 2, the transportation direction of the member for a fuel cell separator 10 is indicated by an arrow. FIG. 2 does not show any specific structure relating to the transportation of the member for a fuel cell separator 10 such as rollers configured to sandwich the member for a fuel cell separator 10 being transported or rollers configured to impart tension to the member for a fuel cell separator 10.

The heater 42 is a device configured to radiate energy for heating to the member for a fuel cell separator 10. As the heater 42, for example, an infrared heater that radiates infrared rays or a fiber laser can be used. The heater 42 needs to be capable of heating an entire range needing inspection in the member for a fuel cell separator 10. The heater 42 of the present embodiment uniformly heats a heating region extending in the width direction of the band-shaped member for a fuel cell separator 10 as shown in FIG. 2. In addition, the member for a fuel cell separator 10 is transported such that the member for a fuel cell separator 10 passes through the heating region at a uniform speed. Therefore, the member for a fuel cell separator 10 can be sequentially heated while being transported. The heater 42 needs to be capable of substantially uniformly radiating energy for heating to the entire range needing inspection in the member for a fuel cell separator 10.

The temperature detector 44 is a temperature sensor configured to detect the temperature of the member for a fuel cell separator 10. As the temperature detector 44, for example, a thermography or an infrared thermometer can be used. As the temperature of the detection subject increases, the detection subject radiates more infrared rays, and the temperature sensor measures the temperature of the detection subject from the amount of the infrared rays radiated from the detection subject. Therefore, the surface temperature of the member for a fuel cell separator 10 can be detected in a non-contact manner. The temperature detector 44 of the present embodiment detects the temperature of a detection range extending in the width direction of the band-shaped member for a fuel cell separator 10. In addition, the member for a fuel cell separator 10 is transported such that the member for a fuel cell separator 10 passes through the detection region at a uniform speed. Therefore, the temperature of the member for a fuel cell separator 10 can be sequentially detected while the member for a fuel cell separator is transported. At the time of detecting the temperature of the member for a fuel cell separator 10, it is desirable to detect at the same time the temperatures of regions heated at the same time under the same conditions by detecting a temperature distribution of a relatively broad range. From the above-described viewpoint, as the temperature detector 44, a thermography is particularly preferably used.

The controller 48 carries out control relating to the operation of the inspection system 40. The controller 48 is configured as a microcomputer including a CPU, a RAM, and a ROM therein. The controller 48 is capable of controlling the driving state of the member for a fuel cell separator 10 by receiving outputs from a variety of switches, not shown, provided in the member for a fuel cell separator 10 or a variety of sensors including the temperature detector 44 and outputting driving signals to individual units such as the rollers relating to transportation. In addition, the controller 48 of the present embodiment functions as a "determination unit" configured to execute a determination operation in the inspection system 40.

Figure 3:
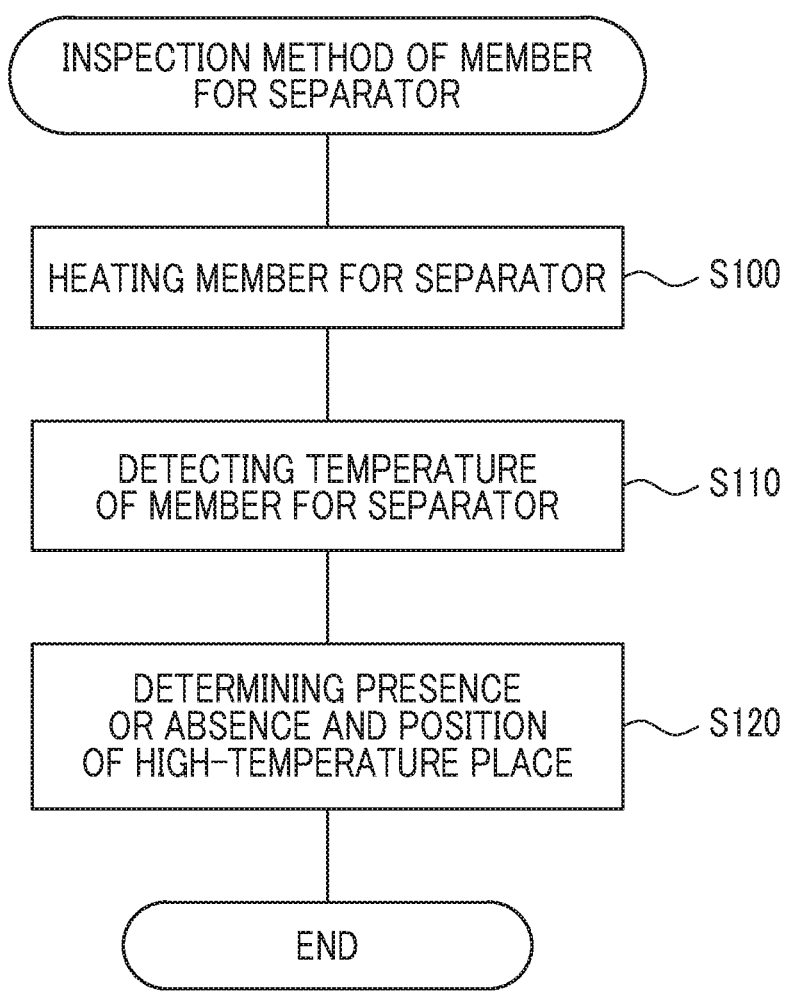
FIG. 3 is a step view showing an inspection method of a member for a fuel cell separator.

FIG. 3 is a step view showing an inspection method of the member for a fuel cell separator 10 executed in the inspection system 40. The inspection method shown in FIG. 3 is executed to detect a place in which carbon is excessively present, that is, an uneven place in which excess carbon particles 34 agglomerate on the surface of the member for a fuel cell separator 10.

At the time of carrying out the inspection of the member for a fuel cell separator 10, first, the member for a fuel cell separator 10 is heated by the heater 42 (step S100). In addition, the temperature of the heated member for a fuel cell separator 10 is detected by the temperature detector 44 (step S110). After that, the presence or absence of a high-temperature place in which the temperature detected by the temperature detector 44 is a previously-set reference temperature or higher and, in a case where there is the high-temperature place, the position of such a high-temperature place is determined (step S120). This operation is executed by the controller 48 as the determination unit acquiring the detection result of the temperature detector 44 and analyzing the detection result.

On the surface of the member for a fuel cell separator 10, the coating layer 30 in which the titanium oxide 32 and the carbon particles 34 are mixed with each other as described above is formed. The titanium oxide and carbon configuring the coating layer differ from each other in radiation factor (thermal emissivity) and specific heat. Therefore, when the heater 42 heats the member for a fuel cell separator 10, in the coating layer 30 of the member for a fuel cell separator 10, the degree of a temperature increase locally differs between a place in which the titanium oxide is present and a place in which carbon is present.

An example of a result obtaining a relationship between the time elapsing from heating and the temperature of the titanium oxide and a relationship between the time elapsing from heating and the temperature of carbon by carrying out simulation in which the amount of radiation energy from the heater 42, the distance between the heater 42 and the member for a fuel cell separator 10, and the like are appropriately set using the radiation factor (thermal emissivity) and specific heat of each of titanium oxide and carbon is shown in FIG. 2. As shown in FIG. 2, the temperatures of titanium oxide and carbon rapidly increase after heat radiation and then gradually decrease. In FIG. 2, an influence of an increase in the temperature of the base material 20 is added to both the increase in the temperature of titanium oxide and the increase in the temperature of carbon in the same manner.

The relationships between the time elapsing from heating and the temperature shown in FIG. 2 can be considered as an imaginary temperature change in a case where the coating layer 30 is fully titanium oxide and as an imaginary temperature change in a case where the coating layer 30 is fully carbon. In the coating layer 30, titanium oxide and carbon are mixed with each other, and thus the actual temperature change of the coating layer 30 is considered to be a value between the temperature change of titanium oxide and the temperature change of carbon shown in FIG. 2. As described above, the carbon particles 34 are dispersed in the coating layer 30; however, in a place in which the carbon particles 34 agglomerate or the like and carbon is excessively present, the degree of a temperature increase after heating becomes greater. Therefore, when there is a reference temperature appropriately set in advance, in step S120, in a case where a high-temperature place having a temperature that is the reference temperature or higher is present in the detection region of the temperature detector 44, the place in which carbon is excessively present can be specified from the position of such a high-temperature place.

An elapsing time t1, which is a timing of temperature detection by the temperature detector 44, needs to be appropriately set in a range of the elapsing time in which $\Delta T$, which is a difference between the temperature of titanium oxide and the temperature of carbon after heating shown in FIG. 2, is sufficiently great and it becomes possible to detect a place in which carbon is excessively present with a sufficient sensitivity by appropriately setting the reference temperature. In addition, the temperature detector 44 needs to be disposed such that it becomes possible to measure the temperature of a position that the heated place passes through when the elapsing time after heating is t1.

After the inspection is carried out as described above, a division step of dividing the band-shaped member for a fuel cell separator 10 such that fuel cell separators having a desirable size can be obtained is carried out. In addition, each of the divided members for a fuel cell separator is processed (pressed or the like) using a die suitable for a desirable shape of the fuel cell separator, thereby producing the fuel cell separator. A sealing member or the like is fixed to the processed fuel cell separator as necessary, and then, the fuel cell separator is laminated and assembled with other members including an electrolyte film, thereby producing a fuel cell.

With the inspection system 40 of the member for a fuel cell separator of the present embodiment configured as described above, the place in which carbon is excessively present is specified by determining the position of the high-temperature place having a temperature after heating being the reference temperature or higher. Therefore, it is possible to accurately detect the place in which carbon is excessively present regardless of the color of the appearance of the member for a fuel cell separator 10 attributed to the thickness of a titanium oxide layer.

In a titanium-based metal member including a titanium or titanium alloy parent material, a part of external light is reflected by the surface of a titanium oxide layer formed on the surface of the metal member, and the remaining part passes through the titanium oxide layer and is reflected by the surface of the parent material. These two kinds of reflected light interfere with each other, and thus the color of the metal member changes due to the thickness of the titanium oxide layer. In a member including the coating layer 30 in which the titanium oxide 32 and the carbon particles 34 are mixed with each other like the member for a fuel cell separator 10 of the present embodiment, strict control of, particularly, the color of the member is likely to become difficult. Therefore, it is difficult to suppress the color of the member including the titanium oxide layer formed on the surface partially becoming close to the color of carbon; however, even when there is a place in which the color of the member is close to the color of carbon as described above, it is possible to accurately specify the place in which carbon is excessively present.

When the place in which carbon is excessively present is detected as described above, for example, in the above-described division step after inspection, the dividing operation for obtaining fuel cell separators does not need to be carried out on the uneven place in which carbon is excessively present. Therefore, it is possible to manufacture a fuel cell separator not including the uneven place.

In a case where there is an uneven place in which carbon is excessively present in the fuel cell separator, for example, a disadvantage of excessive carbon being transferred to the pressing die during the above-described pressing after the division step may be caused. In addition, in a case where there is an uneven place, a disadvantage of a cleaning fluid being contaminated by excessive carbon at the time of cleaning a lubricant applied to the surface of the member for a fuel cell separator during the pressing after pressing may be caused. In addition, in a case where a sealing member is fixed to the surface of the fuel cell separator, a disadvantage of the attachment of excessive carbon to the surface of the sealing member which may lead to an erroneous determination of gas leakage at the time of a gas leakage inspection of the sealing member after the fixation of the sealing member even in a case where there is no problem with the sealing member may be caused. Alternatively, a disadvantage of a decrease in an adhesive force attributed to excessive carbon present on the surface at the time of adhering the fuel cell separator to other members during the assembly of a fuel cell may be caused. With the present embodiment, it is possible to accurately manufacture a fuel cell separator having no uneven place in which carbon is excessively present, and thus the above-described disadvantages can be suppressed.

In addition, in the present embodiment, the division step is not carried out on the uneven place, and thus it is not necessary to carry out inspection on each of the divided members, and inspection can be continuously and efficiently carried out on the band-shaped member for a fuel cell separator 10 as a subject. Furthermore, in a case where inspection is carried out after division, when an uneven place is detected, the entire divided member having the uneven place is rejected; however, in the present embodiment, the division step simply needs to be carried out on the member except for a limited portion including the uneven place, and thus the yield during manufacturing can be improved.

In addition, in the present embodiment, the heater 42 configured to heat the member for a fuel cell separator 10 in a state of being not in contact with the member for a fuel cell separator 10 is used, and the temperature detector 44 configured to detect the temperature of the member for a fuel cell separator 10 in a state of being not in contact with the member for a fuel cell separator 10 is used. In addition, in the present embodiment, the member for a fuel cell separator 10 is formed in a band shape, and the member for a fuel cell separator 10 is transported in the longitudinal direction such that temperature detection by the temperature detector 44 is carried out after heating by the heater 42. Therefore, it is possible to easily speed up a manufacturing step of a fuel cell separator including an inspection step of a member for the separator and efficiently manufacture a fuel cell separator.

B. Second Embodiment

Figure 4:
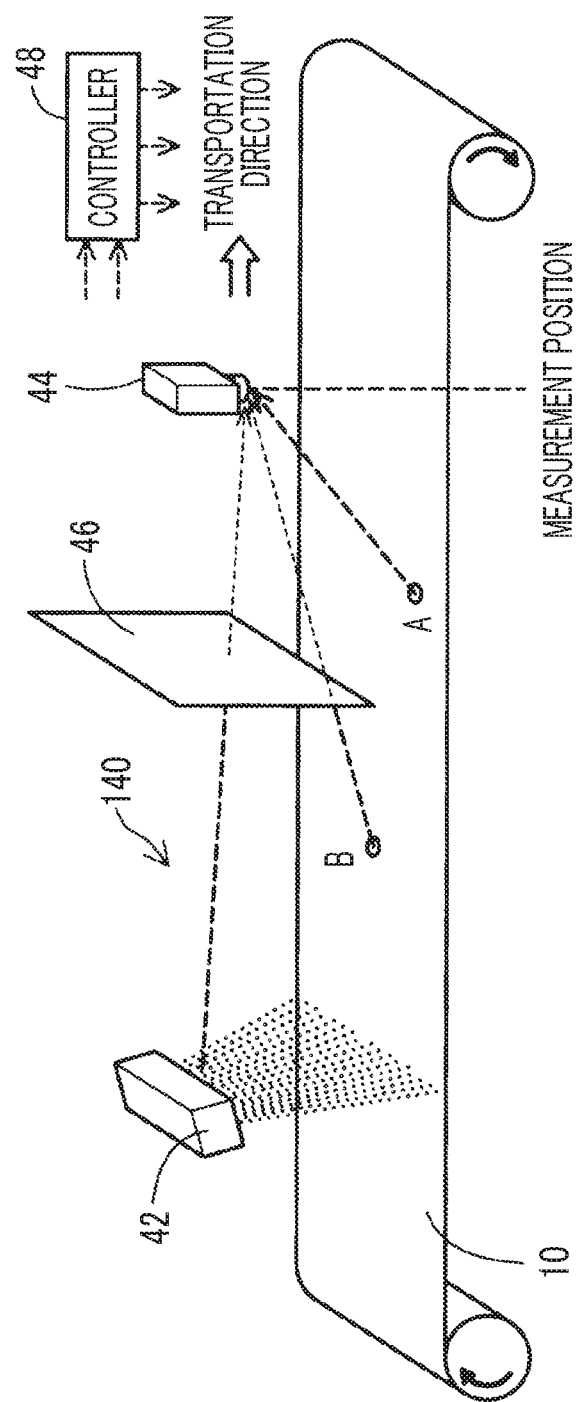
FIG. 4 is a descriptive view showing the schematic configuration of an inspection system.

FIG. 4 is a descriptive view showing the schematic configuration of an inspection system 140 of a member for a fuel cell separator as a second embodiment of the present disclosure. In the second embodiment, a portion common with the first embodiment will be given the same reference sign.

The inspection system 140 of the second embodiment further includes, in addition to the configuration of the inspection system 40 of the first embodiment, a heat shielding member 46. The heat shielding member 46 is disposed between the heater 42 and the temperature detector 44 and functions as a "heat suppression member" configured to suppress heat input from the heater 42 to the temperature detector 44. In the present embodiment, the heat shielding member 46 is made of a plate-shaped member and disposed such that the plate surface becomes perpendicular to the transportation direction of the member for a fuel cell separator 10. The shape of the heat shielding member 46 may be a shape other than the plate shape, but needs to be capable of suppressing heat input from the heater 42 to the temperature detector 44. The material configuring the heat shielding member 46 is not particularly limited, but the use of a resin material or the like having a relatively large specific heat ensures a greater heat capacity of the entire heat shielding member 46, whereby an effect of suppressing the input of heat to the temperature detector 44 can be enhanced.

With the above-described configuration, the heat shielding member 46 suppresses heat input from the heater 42 to the temperature detector 44, and thus it is possible to suppress an increase in the detection value of the temperature detector 44 attributed to heat radiated from the heater 42. For example, in a case where an infrared heater configured to radiate infrared rays as energy for heating is used as the heater 42, infrared rays can be radiated from the heater 42 toward the temperature detector 44. Even in such a case, the radiation of infrared rays from the heater 42 to the temperature detector 44 can be prevented using the heat shielding member 46. Therefore, it is possible to suppress the detection value of the temperature detector 44 exceeding an appropriate temperature range at the time of detecting the temperature by the temperature detector 44. As a result, it is possible to increase the detection accuracy when the temperature detector 44 detects the temperature of the member for a fuel cell separator 10. Furthermore, with the present embodiment, it is possible to decrease damage that the temperature detector 44 receives due to heat radiated from the heater 42.

Furthermore, with the present embodiment, a decrease in the detection accuracy in the temperature detector 44 can be suppressed even in a case where an uneven place in which carbon is excessively present is present upstream of a measurement position in which temperature detection is carried out by the temperature detector 44 in the member for a fuel cell separator 10 since the heat shielding member 46 is provided. In FIG. 4, a position in which the temperature detector 44 detects the temperature of the member for a fuel cell separator 10 is indicated as "measurement position". In the member for a fuel cell separator 10, when an uneven place in which carbon is excessively present is present at a point A upstream of the measurement position in the transportation direction, a part of infrared rays radiated from the point A are input to the temperature detector 44, whereby disturbance may occur during detection. In a case where an uneven place is present at a point B upstream of the point A, the input of infrared rays radiated from the point B to the temperature detector 44 is prevented by the heat shielding member 46. Like the appearance of the temperature changes of carbon and titanium oxide in FIG. 2, when the temperature of an uneven place in which carbon is excessively present is increased by heating by the heater 42, the temperature of the uneven place gradually decreases as the member for a fuel cell separator is transported downstream in the transportation direction. As the temperature decreases, even when infrared rays radiated by the uneven place are input to the temperature detector 44, the occurrence of disturbance becomes more difficult, and an influence on the detection accuracy becomes smaller. In the present embodiment, the heat shielding member 46 is provided, whereby it is possible to suppress the influence of infrared rays radiated by an uneven place having a higher temperature which is present upstream of the disposition position of the heat shielding member 46 in the transportation direction and increase the detection accuracy. As the heat shielding member 46 comes closer to the temperature detector 44 and the size of the heat shielding member 46 increases such that the outer circumferential portion of the heat shielding member 46 comes closer to the surface of the member for a fuel cell separator 10, it is possible to enhance the effect for suppressing the influence of disturbance attributed to the upstream uneven place.

In the inspection system 140, an uneven place in which carbon is excessively present is detected using a difference between the degree of a temperature increase of carbon and the degree of a temperature increase of titanium oxide. Therefore, the distance between the heater 42 and the temperature detector 44 needs to be determined such that a sufficient detection sensitivity can be obtained. With the present embodiment, even in a case where the distance between the heater 42 and the temperature detector 44 is relatively short in order to obtain a sufficient detection sensitivity as described above, it is possible to suppress the influence of heat radiated from the heater 42 and the influence of infrared rays radiated from the uneven place present upstream of the measurement position in the transportation direction and increase the detection accuracy of the temperature detector 44 by providing the heat shielding member 46.

C. Third Embodiment

Figure 5:
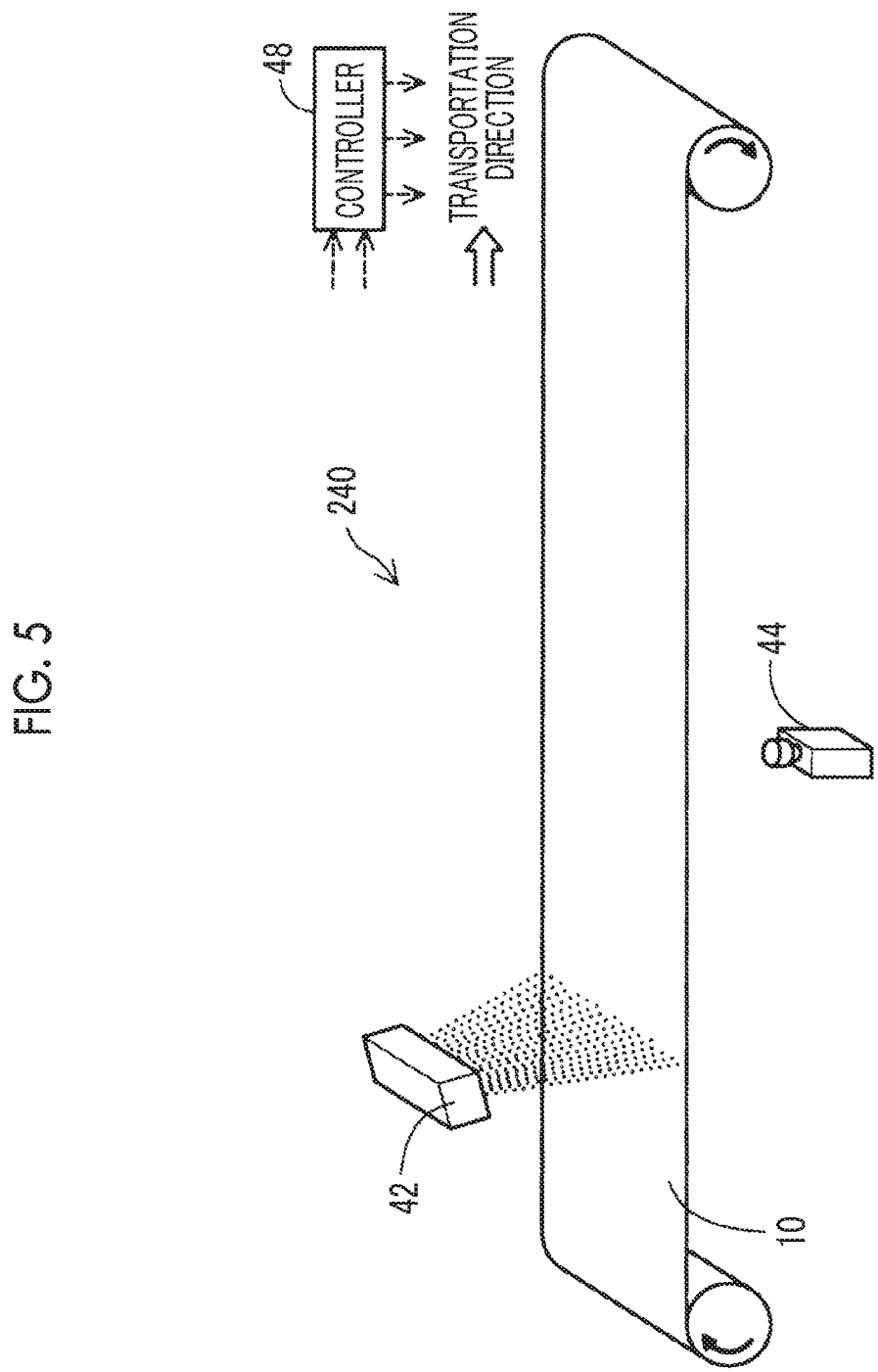
FIG. 5 is a descriptive view showing the schematic configuration of an inspection system.

FIG. 5 is a descriptive view showing the schematic configuration of an inspection system 240 of a member for a fuel cell separator as a third embodiment of the present disclosure. In the third embodiment, a portion common with the first embodiment will be given the same reference sign.

In the inspection system 240 of the third embodiment, unlike the inspection system 40 of the first embodiment, the heater 42 and the temperature detector 44 are disposed on different surface sides of the band-shaped member for a fuel cell separator 10. In the present embodiment, the member for a fuel cell separator 10 disposed between the heater 42 and the temperature detector 44 functions as a "heat suppression member" configured to suppress heat input from the heater 42 to the temperature detector 44.

When configured as described above, the member for a fuel cell separator 10 suppresses heat input from the heater 42 to the temperature detector 44, and thus, similar to the second embodiment, it is possible to increase the detection accuracy at the time of detecting the temperature of the member for a fuel cell separator 10 by the temperature detector 44. Furthermore, it is possible to decrease the possibility of the temperature detector 44 being damaged due to heat radiated from the heater 42.

D. Fourth Embodiment

Figure 6:
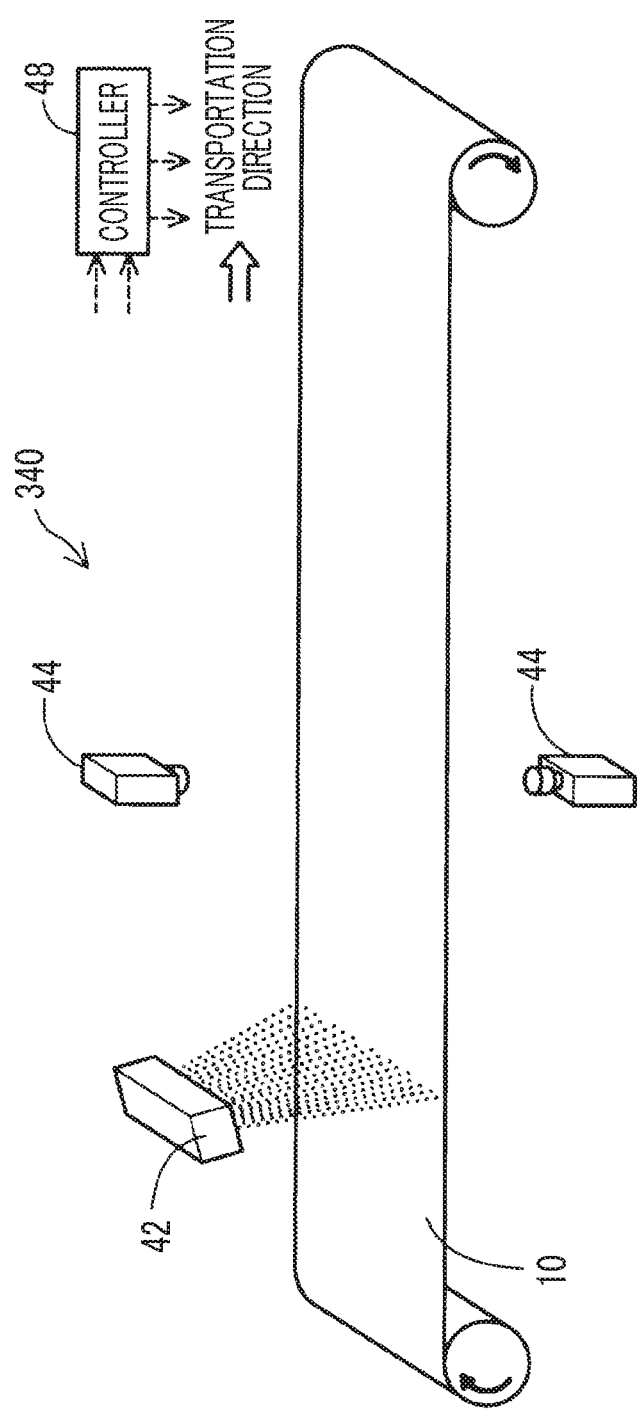
FIG. 6 is a descriptive view showing the schematic configuration of an inspection system.

FIG. 6 is a descriptive view showing the schematic configuration of an inspection system 340 of a member for a fuel cell separator as a fourth embodiment of the present disclosure. In the fourth embodiment, a portion common with the first embodiment will be given the same reference sign.

In the inspection system 340 of the fourth embodiment, unlike the inspection system 40 of the first embodiment, the temperature detectors 44 are respectively disposed on the surfaces of the band-shaped member for a fuel cell separator 10. That is, the temperature detectors 44 are respectively provided to the coating layers, and the respective temperature detectors 44 measure the temperatures of the opposite surfaces of the member for a fuel cell separator 10.

When the member for a fuel cell separator is configured as described above, regardless of which surface of the member for a fuel cell separator 10 an uneven place in which carbon is excessively present is present on, it is possible to accurately detect the uneven place. In a case where an uneven place is present on a surface of the member for a fuel cell separator 10, and the temperature of the uneven place locally increases due to heating using the heater 42, heat is also transferred to the rear surface side of the surface in which the uneven place is present, whereby the temperature locally increases in all portions overlapping with the uneven place in the thickness direction of the member for a fuel cell separator 10. Therefore, even in a case where the temperature detector 44 is provided on solely one surface side, it becomes possible to detect uneven places present on both surfaces of the member for a fuel cell separator 10. However, the base material 20 is present between the respective coating layers 30, and thus, on the rear surface side of the surface on which the uneven place is present, compared with the surface side on which the uneven place is present, the degree of a local temperature increase can become relatively moderate due to the local presence of carbon. With the present embodiment, it is possible to accurately detect an uneven place regardless of which surface the uneven place is present on since the temperature detectors 44 are provided on both surfaces.

In the inspection system 340 of the fourth embodiment, the same heat shielding member 46 as in the second embodiment may be provided between the temperature detector 44 disposed on the same surface side as the heater 42 and the heater 42.

E. Other Embodiments (E1) In the respective embodiments described above, the controller 48 as the determination unit specifies a place in which carbon is excessively present by determining the position of a high-temperature place of which the temperature detected by the temperature detector 44 is a previously-set reference temperature or higher, but the controller may have a different configuration. The determination unit may determine a position in which the degree of a temperature increase is greater than a previously-set reference in the member for a fuel cell separator 10 as the position of the high-temperature place using a temperature detected by the temperature detector 44.

For example, the determination unit may detect a place in which the temperature difference from the ambient temperature is greater than the previously-set reference as a high-temperature place and determine the position thereof. In this case, for example, the average value of values detected by the temperature detector 44 as the temperature of the member for a fuel cell separator 10 for a specific period of time back from the present may be used as the "ambient temperature".

In addition, the temperature detector 44 may measure the temperatures of the member for a fuel cell separator 10 at a plurality of places for which the elapsing time after heating by the heater 42 differs from each other. In addition, the determination unit may detect a place in which the amount of a temperature change when the temperature of the member for a fuel cell separator 10 increases after heating by the heater 42 or the temperature change rate when the temperature of the member for a fuel cell separator 10 increases after heating by the heater 42 is greater than the previously-set reference as the high-temperature place and determine the position thereof.

(E2) In the respective embodiments described above, the heater 42 heats the member for a fuel cell separator 10 in a state of being not in contact with the member for a fuel cell separator 10, and the temperature detector 44 detects the temperature of the member for a fuel cell separator 10 in a state of being not in contact with the member for a fuel cell separator 10, but the heater and the temperature detector may have a different configuration. For example, at least one of the heater 42 and the temperature detector 44 may be provided so as to be in contact with the member for a fuel cell separator 10.

(E3) In the respective embodiments described above, the member for a fuel cell separator 10 is formed in a band shape, but may have a different configuration. For example, heating by the heater 42 and temperature detection by the temperature detector 44 may be sequentially carried out using members for a fuel cell separator cut in advance to shapes suitable for individual fuel cell separators.

(E4) A member for a fuel cell separator that is an inspection subject may be a member obtained by a manufacturing method different from those for the members for a fuel cell separator 10 of the respective embodiments described above. As long as the member has a coating layer including carbon formed on a titanium or titanium alloy base material, the same effect can be obtained by detecting an uneven place in which carbon is excessively present by applying the same inspection method as the respective embodiments described above. In addition, in the member for a fuel cell separator 10, the coating layer including carbon may be formed on solely one surface, and the same effect can be obtained by applying the same inspection method as the respective embodiments described above to the one surface.

The present disclosure is not limited to the respective embodiments described above and can be realized in a variety of configurations within the scope of the gist of the present disclosure. For example, technical features of the embodiments corresponding to the technical features in the respective forms described in the section of the summary of the disclosure can be appropriately replaced or combined in order to solve a part or all of the above-described problems or to attain a part or all of the above-described effects. In addition, the technical features can be appropriately deleted as long as not described as essential in the present specification.

What is claimed is:

1. An inspection system of a member for a fuel cell separator, the member for a fuel cell separator including a titanium or titanium alloy base material and a coating layer that includes carbon and is formed on a surface of the base material, the inspection system comprising:
   a heater configured to heat the member for a fuel cell separator;
   a temperature detector configured to detect a temperature of the member for a fuel cell separator after heated by the heater; and
   a determination unit configured to determine a position of a high-temperature place in which the temperature detected by the temperature detector is greater than a previously-set standard;
   wherein the determination unit is configured to specify a place in which carbon is excessively present by determining the position of the high-temperature place.

2. The inspection system according to claim 1, further comprising a heat suppression member disposed between the heater and the temperature detector and configured to suppress heat input from the heater to the temperature detector.

3. The inspection system according to claim 1, wherein:
   the heater heats the member for a fuel cell separator in a state of being not in contact with the member for a fuel cell separator;
   the temperature detector detects the temperature of the member for a fuel cell separator in a state of being not in contact with the member for a fuel cell separator; and
   the member for a fuel cell separator is formed in a band shape and is transported in a longitudinal direction such that the temperature is detected by the temperature detector after the member for a fuel cell separator is heated by the heater.

4. The inspection system according to claim 1, wherein:
the member for a fuel cell separator includes the coating layers on both surfaces of the base material respectively; and
the temperature detector is provided to each of the coating layers.

5. An inspection method of a member for a fuel cell separator, the member for a fuel cell separator including a titanium or titanium alloy base material and a coating layer that includes carbon and is formed on a surface of the base material, the inspection method comprising:
heating the member for a fuel cell separator;
detecting a temperature of the member for a fuel cell separator after heated;
determining a position of a high-temperature place in which the temperature detected by the temperature detector is greater than a previously-set standard; and
specifying a place in which carbon is excessively present by determining the position of the high-temperature place.

* * * * *